United States Patent [19]

Hosaka et al.

[11] Patent Number: 4,461,257
[45] Date of Patent: Jul. 24, 1984

[54] METHOD AND SYSTEM FOR CONTROLLING ENGINE IGNITION TIMING

[75] Inventors: Akio Hosaka, Yokohama; Shigeo Aono, Tokyo, both of Japan

[73] Assignee: Nissan Motor Company, Limited, Yokohama, Japan

[21] Appl. No.: 247,905

[22] Filed: Mar. 26, 1981

[30] Foreign Application Priority Data

Mar. 28, 1980 [JP] Japan .................................. 55-38967
Mar. 28, 1980 [JP] Japan .................................. 55-38968

[51] Int. Cl.³ .............................................. F02P 5/04
[52] U.S. Cl. ...................................... 123/419; 123/436
[58] Field of Search ............................... 123/419, 436

[56] References Cited

U.S. PATENT DOCUMENTS

| | | | |
|---|---|---|---|
| 3,789,816 | 2/1974 | Taplin | 123/436 |
| 3,942,491 | 3/1976 | Seite | 123/425 |
| 4,044,234 | 8/1977 | Frobenius | 123/436 |
| 4,044,236 | 8/1977 | Bianchi | 123/436 |
| 4,061,025 | 12/1977 | Willenbecher et al. | 123/425 |
| 4,064,846 | 12/1977 | Latsch | 123/419 |
| 4,104,990 | 8/1978 | Frobenius | 123/436 |
| 4,134,374 | 1/1979 | Latsch | 123/436 |
| 4,138,979 | 2/1979 | Taplin | 123/436 |
| 4,140,083 | 2/1979 | Frobenius | 123/436 |
| 4,153,013 | 5/1979 | Bianchi et al. | 123/435 |
| 4,161,162 | 7/1979 | Latsch et al. | 123/435 |
| 4,178,891 | 12/1979 | Latsch et al. | 123/425 |
| 4,197,767 | 4/1980 | Leung | 123/419 |
| 4,232,643 | 11/1980 | Leshner | 123/436 |
| 4,357,918 | 11/1982 | Asano | 123/419 |

FOREIGN PATENT DOCUMENTS

| | | | |
|---|---|---|---|
| 0022159 | 1/1981 | European Pat. Off. | 123/419 |
| 2228387 | 12/1973 | Fed. Rep. of Germany | 123/419 |
| 2801512 | 7/1978 | Fed. Rep. of Germany | 123/419 |
| 2732781 | 2/1979 | Fed. Rep. of Germany | 123/419 |
| 2845354 | 4/1979 | Fed. Rep. of Germany | 123/419 |
| 2925770 | 1/1980 | Fed. Rep. of Germany | 123/419 |
| 2425549 | 12/1979 | France | 123/419 |
| 50145728 | 5/1979 | Japan | 123/435 |
| 1529364 | 10/1978 | United Kingdom | 123/419 |
| 1543377 | 2/1979 | United Kingdom | 123/419 |
| 1544275 | 4/1979 | United Kingdom | 123/419 |
| 2055964 | 4/1983 | United Kingdom | 123/419 |
| 2051233 | 6/1983 | United Kingdom | 123/419 |

Primary Examiner—Ronald B. Cox
Attorney, Agent, or Firm—Schwartz, Jeffery, Schwaab, Mack, Blumenthal & Koch

[57] ABSTRACT

A method and system for correcting engine ignition timing without the use of any pressure sensor or vibration sensor and depending upon engine knocking is disclosed. The presence or absence of knocking is determined by reference to the rate of change of engine speed. This method is based on the fact that engine speed changes abruptly when engine knocking occurs, as compared with the normal engine condition, because of abrupt changes in pressure within the cylinders. The system of the present invention comprises an crankshaft angle sensor to generate a crankshaft angle pulse signal, a period measuring means to output an interrupt request signal and to determine the presence or absence of engine knocking, a microcomputer, and an ignition signal generator for outputting an ignition signal in accordance with an ignition timing signal and a dwell angle signal.

18 Claims, 10 Drawing Figures

METHOD AND SYSTEM FOR CONTROLLING ENGINE IGNITION TIMING

BACKGROUND OF THE INVENTION

1. Field of the Invention

The present invention relates generally to a method and system for controlling and correcting engine ignition timing such that engine ignition timing is controlled and corrected according to the presence or absence of engine knocking, and more particularly to a method and system for detecting engine knocking such that the presence of absence of engine knocking is determined by reference to the rate of change of engine speed.

2. Description of the Prior Art

In order to improve engine performance and fuel consumption efficiency, methods are known for increasing the engine compression ratio and for advancing the ignition timing. However since these methods tend to generate engine knocking, it is necessary to take measures to detect such knocking so that the engine ignition can be delayed to counteract the knocking.

There exist two methods of detecting engine knocking; the first method entails measuring the pressure in the engine cylinders and using the result to correct the ignition timing, the second method entails measuring engine vibrations and using the result to control the ignition timing.

Figure 1:
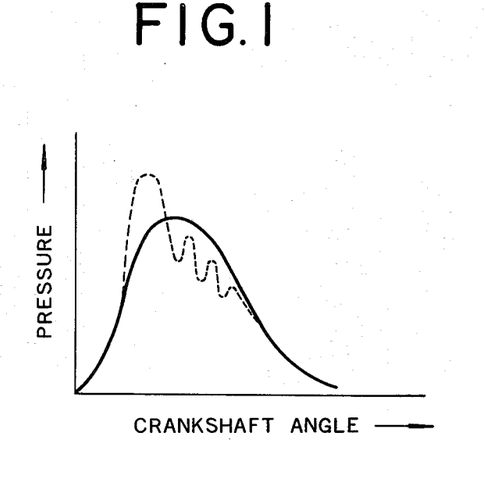
FIG. 1 is a graphical representation showing the relationship between pressure in engine cylinder and crankshaft angle.

In the former method, when no engine knocking occurs, pressure in the engine cylinders changes smoothly with respect to the crankshaft angle, as depicted by the solid line in FIG. 1; however, when knocking occurs, the pressure changes abruptly because of abnormal fuel combustion, as is depicted by the broken line in FIG. 1. Therefore, it is possible to detect the presence or absence of engine knocking by measuring changes in cylinder pressure. In the vibration measuring method, it is possible to detect the presence or absence of knocking by measuring abnormal engine vibrations caused by the above-mentioned abrupt changes in cylinder pressure.

These prior-art methods for detecting knocking, suffer from a shortcoming in that the cost is relatively high since a high quality pressure sensor which can withstand the high temperatures and pressures of an engine cylinder, or a highly sensitive vibration sensor which can detect small engine vibrations accurately is required. In addition, in connection with the pressure detection method, it is quite difficult to assure the durability of the pressure sensor; and in connection with the vibration detection method, it is difficult to assure the durability of the vibration sensor since a large deformation of the vibrator is required to increase the level of signals detected by the vibration sensor for more accurate detection of engine vibration.

Therefore, prior to the present invention, difficulties have been encountered with regard to efforts to correct the ignition timing of an engine without generating engine knocking.

BRIEF SUMMARY OF THE INVENTION

With these problems in mind, therefore, it is a primary object of the present invention to provide a method of controlling the ignition timing of an engine, without using a pressure sensor or a vibration sensor, and to determine the presence or absence of engine knocking by measuring the rate of change of engine speed. This method is based on the fact that the engine speed changes smoothly with respect to the crankshaft angle as depicted by the solid line in FIG. 2 when no engine knocking occurs, but changes abruptly from the normal condition, as is depicted by a broken line in FIG. 2, because of the abrupt changes in pressure shown by the broken line in FIG. 1 when engine knocking occurs.

To achieve the above mentioned object, the method of controlling engine ignition timing according to the present invention comprises the steps of detecting the rate of change of engine speed, determining the presence or absence of engine knocking in accordance with the detected rate of change of engine speed, and correcting the engine ignition timing accordingly.

Further, the system for controlling engine ignition timing according to the present invention comprises an crankshaft angle sensor to generate an angle pulse signal, a period measuring means to output an interrupt request signal and to determine the presence or absence of engine knocking, a microcomputer, and an ignition signal generator for outputting an ignition signal in accordance with the ignition timing data and the dwell angle data.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The features and advantages of the method and system for correcting engine ignition timing according to the present invention will be more clearly appreciated from the following description taken in conjunction with the accompanying drawings in which like reference numerals designates corresponding elements, and in which.

DETAILED DESCRIPTION OF THE PREFERRED EMBODIMENTS

Figure 3:
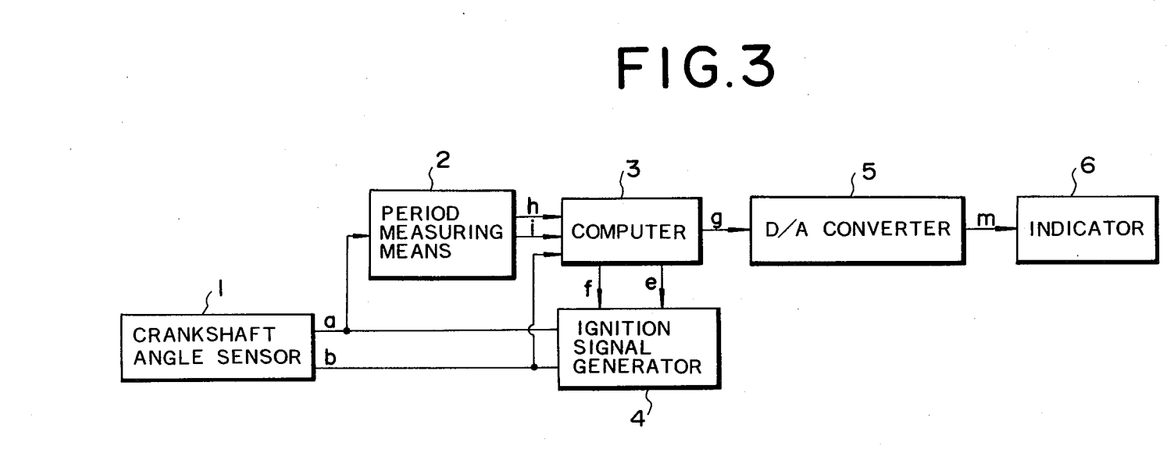
FIG. 3 is a schematic block diagram of an exemplary embodiment according to the present invention.

With reference to FIG. 3, a detailed description will be made hereinafter of an embodiment of the present invention, in which the method of detecting engine knocking according to the present invention is applied to an ignition timing control system.

Figure 4:
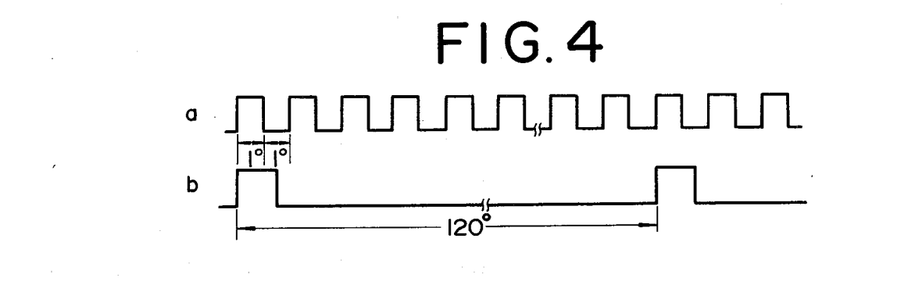
FIG. 4 is a waveform diagram showing the output pulse signal generated from a crankshaft angle detector.

In FIG. 3, a crankshaft angle sensor 1 generates both a first pulse signal a and a second pulse signal b for each predetermined angle of rotation of the crankshaft. For instance, when this invention is applied to a six-cylinder engine, the pulse signal a is generated every degree of crankshaft revolution and the pulse signal b is generated every 120 degrees of crankshaft revolution, as shown in FIG. 4.

For the crankshaft angle detection means 1, for example, there are many prior-art means such as a combination of an electromagnetic pickup with a set of gears, a combination of light-emitting/receiving elements with a disk having a slit, a combination of a magnet-sensitive element with a disk having a magnet, etc.

Figure 5:
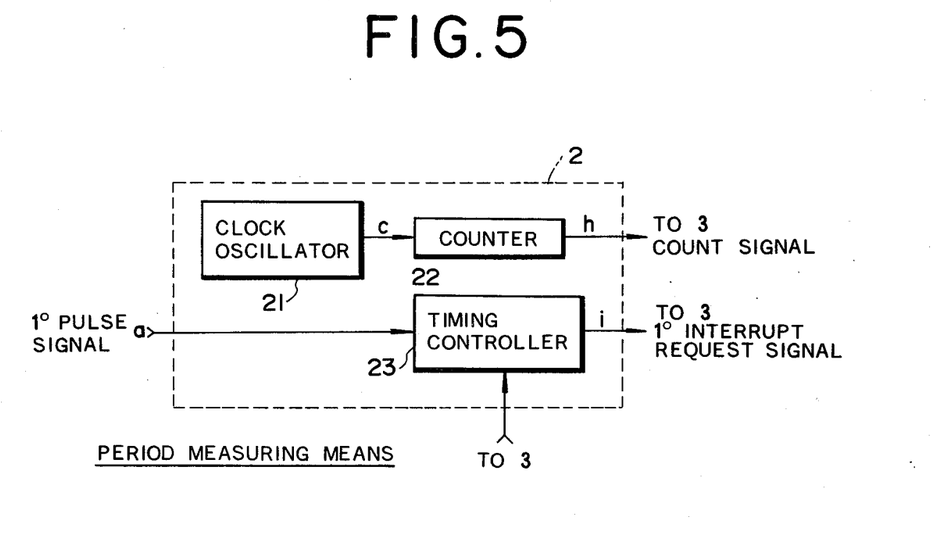
FIG. 5 is a schematic block diagram showing the configuration of a pulse period measuring means.

As shown in detail in FIG. 5, a pulse period measuring means 2 includes a clock oscillator 21, a counter 22 and a timing controller 23, in which the period of the pulse signal a is counted under the control of a microcomputer 3 which functions both as calculator and memory. The timing controller 23 outputs to the microcomputer an interrupt request signal i, which is generated for example every degree of crankshaft revolution in synchronization with the pulse signal a, the counter 22 outputs a count signal h (reference signal) produced as the counter 22 counts the clock signal c from the clock oscillator 21 during the one-degree rotation of the crankshaft; the difference between two consecutive count signals is calculated by the microcomputer to obtain the period of the pulse signal a when the interrupt request signal i is applied thereto to execute its program.

Figure 6:
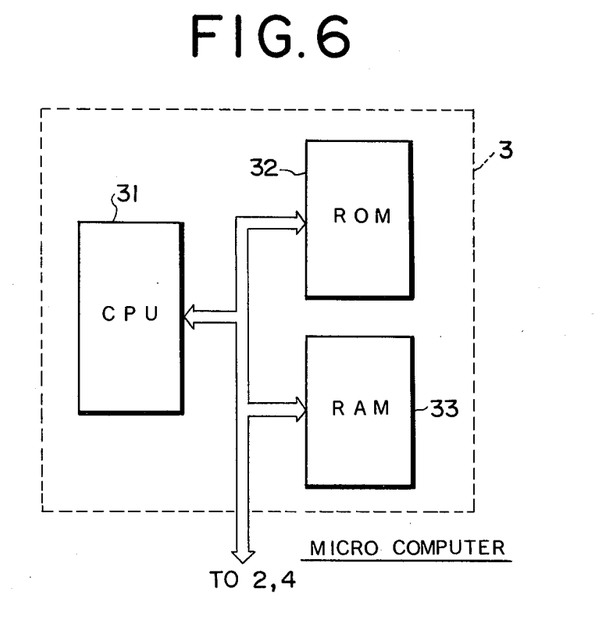
FIG. 6 is a schematic block diagram of a basic configuration of a microcomputer.

As best seen in FIG. 6, the microcomputer 3 comprises a central processing unit (CPU) 31, a read only memory (ROM) 32 to store programs described later, and a random access memory (RAM) 33 to store temporarily various calculated data. The function of the microcomputer 3 is to use the pulse signal a to obtain the instantaneous value of engine speed or the mean value of the engine speed, to compare the calculated speed with a reference value to determine whether or not knocking is present, to output an appropriate ignition timing signal f and a dwell angle signal e to an ignition signal generating means 2 according to the presence or absence of knocking, and to output a signal g according to the rate of change of the above-mentioned speed, to a D/A converter 5 which ultimately actuates knocking indicator 6 (as shown in FIG. 3).

Figure 8:
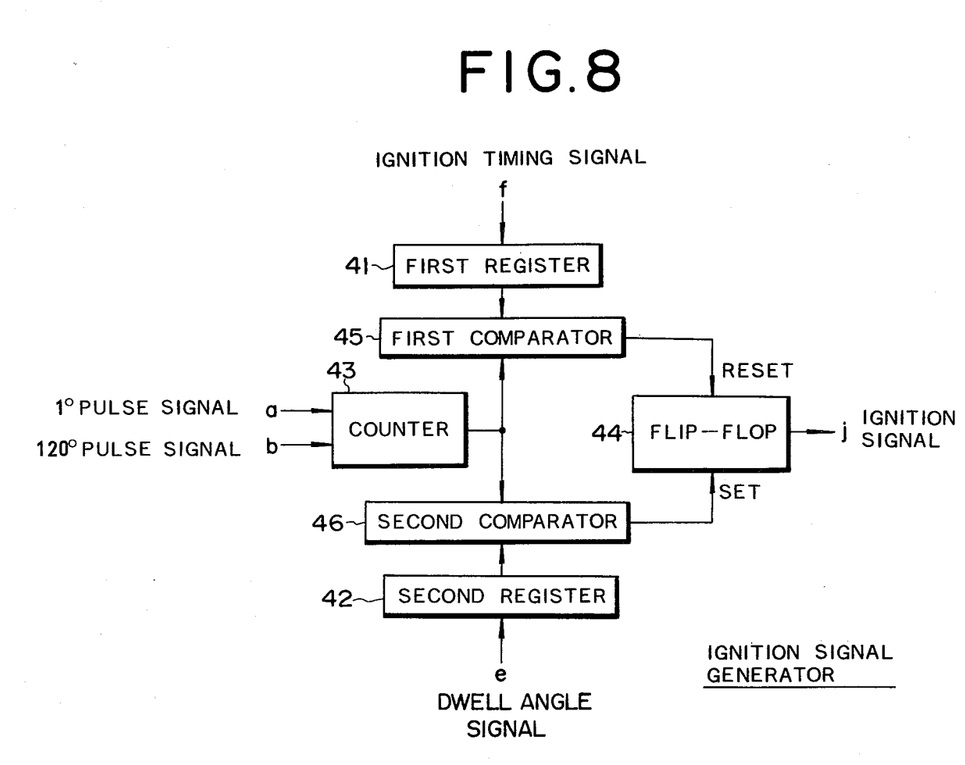
FIG. 8 is a schematic block diagram showing the configuration of an ignition signal generator.

As shown in FIG. 8, an ignition signal generator 4 includes a first register 41 to store the ignition timing signal f from the microcomputer, a second register 42 to store the dwell angle signal data e from the microcomputer, a counter 43 which is reset by the pulse signal b (every 120° of crankshaft rotation), counts the pulse signals a (every degree of crankshaft rotation) and determines the current crankshaft position, a first comparator 45 which compares the value measured by the counter 43 with that in the register 41 to stop the ignition signal j at the output of a flip-flop 44 by resetting the flip-flop 44 when the values coincide, and a second comparator 46 which compares the value measured by the counter 43 with that in the register 42 to start the ignition signal j of the output of the flip-flop 44 by setting the flip-flop when both the values coincide. In this embodiment, ignition is performed at the appropriate crankshaft angles determined by reference to the ignition timing signal f with an appropriate period of time determined by the dwell angle signal (e), during which the primary current of the ignition coil (not shown) is passed according to the ignition signal j.

With reference to the flowcharts of FIGS. 7(a), (b) and (c), there follows an explanation of the operation of the microcomputer 3 used with the embodiment described hereinabove.

Figure 7A:
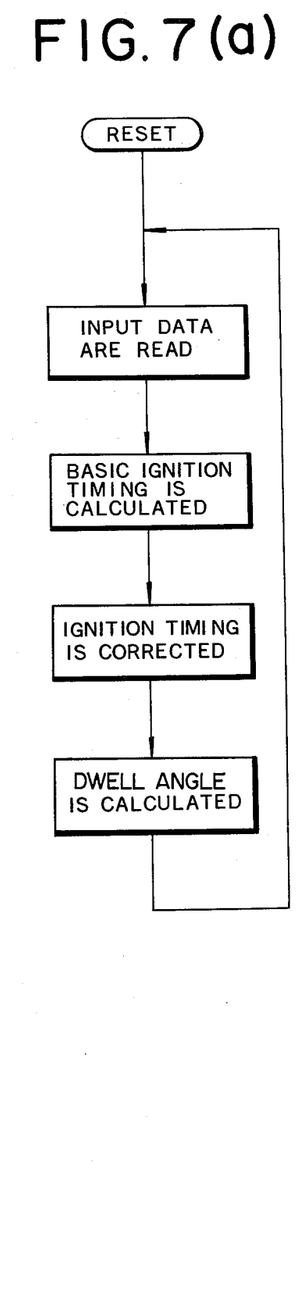
FIGS. 7(a), (b) and (c) are flowcharts showing the respective operations executed by the microcomputer.
Figure 7B:
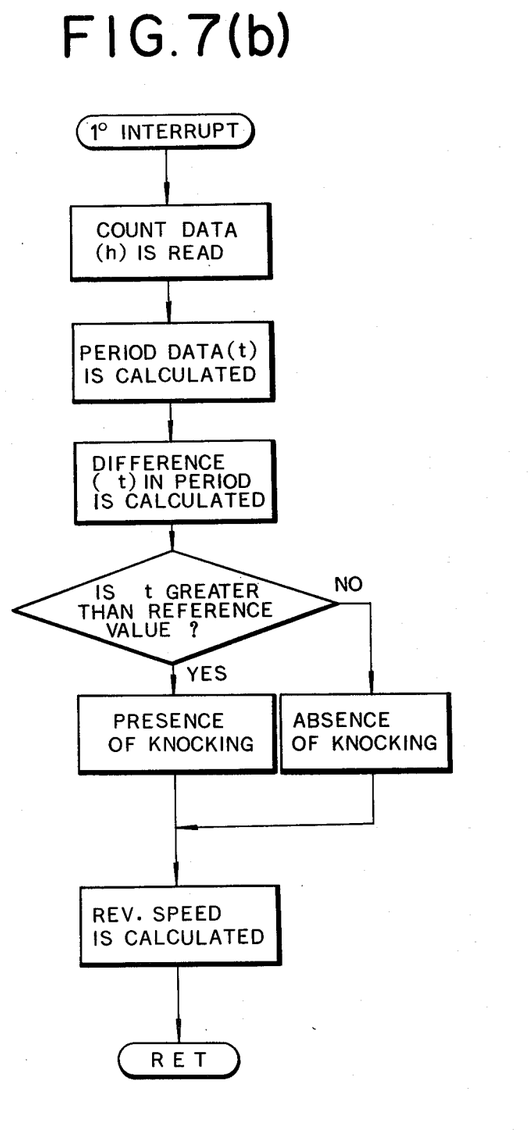
Figure 7C:
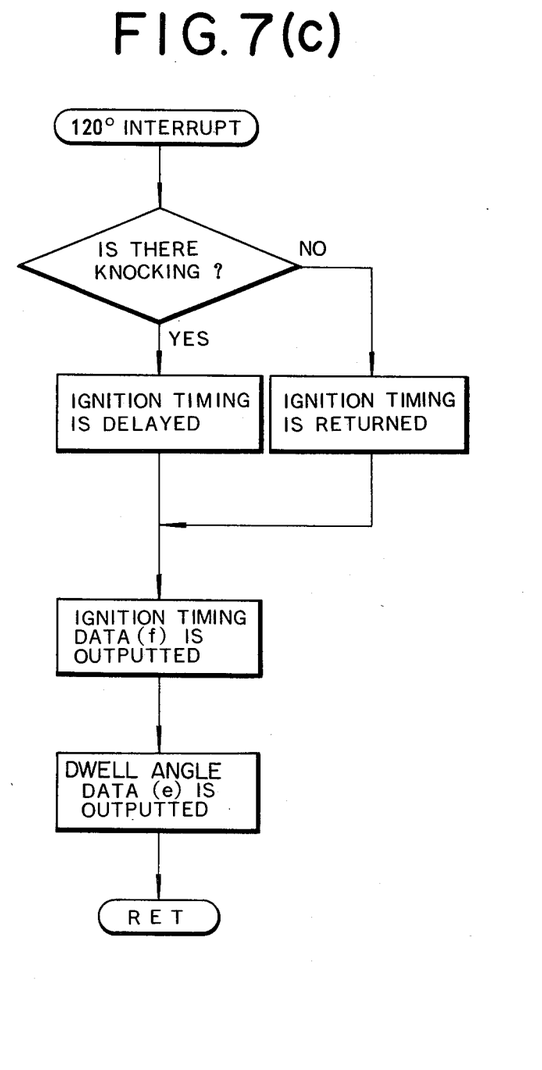

As shown in FIG. 7(a), when the power supply is turned on, the operation immediately starts from "RESET", and various input data are read thereinto in order to perform the ordinary ignition timing control for the engine. The input data (not shown in FIG. 3) are various signals to indicate engine operating conditions such as intake air flow rate, exhaust pressure, throttle opening angle, engine coolant temperature, intake air temperature, battery voltage, etc.

The ordinary ignition timing is determined from the input data. First the basic ignition timing is calculated from the measured engine speed described hereinafter and the data indicating the engine operating conditions. Next, the ignition timing is corrected by reference to the coolant temperature and intake air temperature. After these operations, the period of dwell angle, during which the primary current of the ignition coil is on, is calculated by reference to the data so that the ignition energy is constant regardless of the engine speed and power supply voltage. That is to say, the most updated data is stored in the RAM 33 of the microcomputer 3 by performing the above-mentioned calculations repeatedly.

Next a detailed description will be made of the method of determining the presence or absence of knocking. As indicated above the period of the pulse signal a is measured by the period measuring means 2, the period data is obtained when the CPU 31 of the microcomputer 3 executes the interupt process program which is called out in accordance with the interrupt request signal i generated every degree of crankshaft rotation from the timing controller 23 shown in FIG. 5.

When this interrupt request signal i is inputted, the CPU 31 which is executing the arithmetic process shown in FIG. 7(a) repeatedly interrupts the process temporarily and executes the other arithmetic process shown in FIG. 7(b) beginning from "one degree interrupt".

More specifically, first the count signal h in the counter 22 is read thereinto. Next, the period t of the signal a from its leading edge to its trailing edge or vice versa is calculated based on the current count data and the preceding count data read thereinto in the preceding readin operation, and is stored into the RAM 33. Next, in the same way, the difference $\Delta t$ is calculated between the preceding period already calculated and stored into the RAM 33 and the current period just calculated.

In addition, since the period t is a reciprocal of the instantaneous value of engine speed, the greater the difference $\Delta t$, the larger the rate of change of engine speed, thus it is possible to know the rate of change of the instantaneous value of engine speed.

Of course, it is possible to obtain the rate of change directly by calculating the difference between the two values after obtaining the instantaneous value of the engine speed.

The difference $\Delta t$ is now compared with a predetermined reference value. When the difference $\Delta t$ is greater than the reference value, the presence of knocking is determined, and when $\Delta t$ is smaller than the reference value, the absence of knocking is determined. The result is kept stored in the RAM 33.

The reciprocal of the period t is calculated also to obtain the instantaneous value of engine speed to be used in the calculation of the basic ignition timing already described.

In this embodiment, when the difference Δt between the period data is calculated, a digital signal g based on the rate of difference is outputted to the D/A converter 5, and the rate of change of engine revolution, that is, the rate of knocking is displayed on the indicator 6 shown in FIG. 3.

When the above-mentioned arithmetical process in FIG. 7(b) has been completed, the arithmetic process beginning from "RESET" in FIG. 7(a) is restarted beginning from the program which is interrupted by the one degree interrupt request signal i.

A detailed description will be made hereinbelow of the method of correcting ignition timing in accordance with the detection of engine knocking.

When the pulse signal b, that is, the signal generated every 120° of crankshaft rotation is inputted to the CPU 31 of the microcomputer 3, the arithmetical process starts from "120° interrupt" in FIG. 7(c).

First, the presence or absence of engine knocking is determined through the arithmetical process shown in FIG. 7(b), and the knocking signal stored in the RAM 33 is checked. When knocking is detected, the ignition timing signal f and the dwell angle signal e are outputted from the microcomputer 3 to the ignition signal generating means 4 after being corrected so as to delay the ignition timing. When knocking is not detected, the ignition timing signal f and dwell angle signal e are outputted to the means 4 while returning the correction rate to zero gradually when delaying correction has already been performed, or are outputted without any correction when correction was not performed in the previous ignition. The ignition signal generating means 4 generates an ignition signal j based on both the signals f and e and the pulse signals a and b generated from the crankshaft angle detection means 1, in order to control the period of the current being passed through the ignition coil (not shown) and the ignition timing without generating knocking.

As described above, the process shown in FIG. 7(a) is always executed to control the ordinary ignition timing; the process shown in FIG. 7(b) is temporarily executed when the one-degree interrupt request signal i is inputted to the microcomputer 3 to determine whether or not knocking is present by reference to the rate of change of engine speed; the process shown in FIG. 7(c) is also temporarily executed whenever the 120° interrupt request signal b is inputted to the microcomputer 3 to determine the ignition timing data (f) and dwell angle data according to the presence or absence of knocking.

The basic embodiment of the present invention has been described hereinabove, and the other embodiment of the present invention will be described hereinbelow.

When this invention is applied to an engine other than a six-cylinder engine, it is only necessary to change the pulse signal b. For instance, this pulse is generated every 180° of engine revolution angle in the case of an four-cylinder engine, and every 90° (720°/8 cylinders) in the case of an eight-cylinder engine.

It is not necessary to measure the period every degree of crankshaft revolution angle. For instance, it is possible to use a pulse signal a which is initiated every two degrees (or some other appropriate interval) of crankshaft rotation, and again measure the period of the pulse signal a from the leading edge to the next trailing edge.

Further, during arithmetical processing it is possible to calculate the difference Δt depending upon the results measured for example, at every other or every third data point. When the period between data points is long, as in this case, there is an advantage such that it is possible to use a low-priced microcomputer with its peripheral devices which have a slow arithmetical process speed.

Regarding the determination of the presence or absence of knocking, it is possible to be more accurate by changing the reference value in accordance with the engine operating conditions. For instance, when the engine speed is low, the absolute value of the rate of change of engine speed due to engine knocking is small; however, when the engine speed is high, the absolute value of the rate of change becomes large. Therefore, it is possible to change the reference value in accordance with variations in engine speed.

In this embodiment, the same effect can be obtained by multiplying the value obtained from the engine speed by the difference Δt in period and by comparing it with the constant reference value.

It is also possible to change the reference value or to correct the difference Δt in accordance with factors other than engine speed, such as coolant temperature, engine load, vehicle speed, etc.

Figure 2:
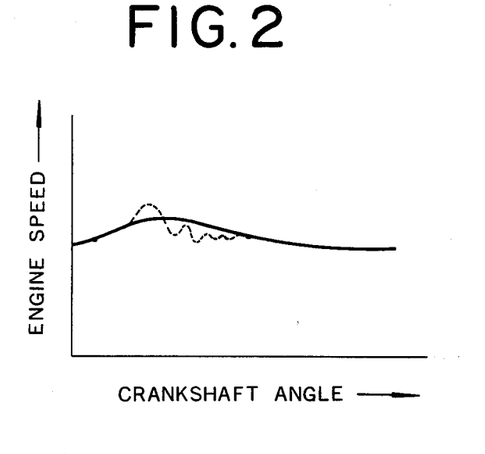
FIG. 2 is a graphical representation showing the relationship between engine speed and crankshaft angle.

Further, as will be understood by FIG. 2, the period during which the instantaneous value of engine speed changes due to the occurrence of engine knocking is restricted to a certain range. The range extends from immediately after ignition, i.e. a short period of time immediately after combustion begins, until close to the top dead center position. Therefore, it is possible to obtain a more accurate result if the determination of the presence or absence of knocking is done only within this range. Thus it is desirable that the crankshaft angle detecting means 1 is preset so that the pulse signal b is generated near the top dead center, and the determination is performed only after the signal is inputted.

Further, it is possible to use the mean value within a given angle range without using the instantaneously calculated value of engine speed. In this case, it is possible to use a mean value after adding several period data t, or to measure the period of the pulse signal a separately, or the number of pulses of the pulse signal a within a given period of time.

Apart from the correction of engine ignition timing depending upon the presence or absence of engine knocking, which has been described hereinabove, it is possible to adopt another method such that the ignition timing is advanced when no engine knocking is detected, and is slowly returned to the original timing by a timing delay imposed by the presence of knocking.

As described hereinabove, according to the present invention, since the presence or absence of engine knocking is determined by reference to the rate of change of engine speed, and the ignition timing is corrected in accordance with the determined results, it is possible to improve the fuel consumption efficiency and the performance of an engine, while avoiding or preventing engine knocking by detecting the occurrence of engine knocking through the use of a conventional crankshaft angle detecting means to generate crankshaft angle pulses, without the use of a conventional expensive pressure sensors or vibration sensors.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A method of detecting knocking of an engine having a crankshaft, comprising the steps of:
   (a) detecting the rate of change of engine speed by:
      (i) sensing when the crankshaft rotates through a predetermined small angle of less than 10°;
      (ii) counting pulses of a fixed-frequency clock pulse signal during rotation of the crankshaft through said predetermined small angle to obtain a period value;
      (iii) repeating steps (i) and (ii); and
      (iv) calculating a difference between period value obtained in two separate executions of steps (i) and (ii);
   (b) comparing the detected rate of change with a predetermined reference value; and
   (c) producing a knocking presence signal when the detected rate of change exceeds the reference value.

2. A system for detecting engine knocking, comprising:
   (a) a crankshaft angle sensor for generating a small-angle pulse signal having a period corresponding to a small angle comprising less than 10° of crankshaft rotation;
   (b) a period measuring means for counting a number of clock-pulse signals while the crankshaft rotates through the predetermined small angle; and
   (c) a computing device connected to said sensor and said measuring means and operable for determining the period of the small-angle pulse signal on the basis of a clock-pulse count signal outputted from said period measuring means, and for determining a difference between a current period and a previous period stored in said computing device, and for comparing the period difference with a stored reference value, and for outputting an engine knocking presence signal when the period difference is more than the reference value and an engine knocking absence signal when the period difference is less than the reference value.

3. A method of detecting engine knocking as set forth in claim 1, further comprising the step of producing a knocking absence signal when the detected rate of change does not exceed the reference value.

4. A system for detecting engine knocking as set forth in claim 2, wherein said period measuring means outputs an interrupt request signal synchronized with the small-angle pulse signal generated from said crankshaft sensor, said interrupt request signal being applied to said computing device.

5. A system for detecting engine knocking as set forth in claim 2, wherein the difference between the current period and the previous period value stored in said computing device is determined by reference to instantaneous values of the period.

6. A system for detecting engine knocking as set forth in claim 7, wherein the difference between the current period and the previous period value stored in said computing device is determined by reference to mean values of the period.

7. A system for detecting engine knocking as set forth in claim 2, wherein said period measuring means comprises:
   (a) a clock oscillator for generating a reference clock pulse signal as a standard time signal;
   (b) a counter connected to said clock oscillator for counting the clock pulse signals generated from said clock oscillator; and
   (c) a timing controller connected to said crankshaft angle sensor for receiving the pulse signal generated from said crankshaft angle sensor and outputting an interrupt request signal to said computing device to execute instructions for determining the difference between the current period and the previous value stored in said calculating device and for comparing the current difference with a reference value stored in said computing device in order to determine the presence or absence of engine knocking.

8. A system for detecting engine knocking as set forth in claim 2, which further comprises:
   (a) an D-A converter for converting a digital signal outputted from said computing device representative of a rate of change of the difference between the current period and the previous period value stored in said computing device into an analog signal; and
   (b) an indicator for indicating the rate of change outputted from said D-A converter.

9. A system for detecting engine knocking as set forth in claim 2, which further comprises an ignition signal generator connected to said crankshaft angle sensor and said computing device for outputting a basic ignition signal by reference to an ignition timing signal and a dwell angle signal obtained in accordance with an output from said computing device on the basis of data inputted thereinto when said computing device determines the absence of engine knocking and for outputting a delayed ignition signal when said computing device determines the presence of engine knocking.

10. A system for detecting engine knocking as set forth in claim 9, wherein said ignition signal generator comprises:
   (a) a counter connected to said crankshaft angle sensor for counting a first pulse signal to measure the rotation of the crankshaft from a standard position at which said counter is reset by a second pulse signal;
   (b) a first register for storing the ignition timing signal from said computing device;
   (c) a second register for storing the dwell angle signal from said computing device;
   (d) a first comparator for comparing the value in said counter with that in said first register and for outputting a set signal when the signals coincide;
   (e) a second comparator for comparing the value in said counter with that in second register and for outputting a reset signal when the signals coincide; and
   (f) a flip-flop for outputting an ignition signal operable to control the primary current of an ignition coil wherein said flip-flop is set by the set signal to start the ignition signal and is reset by the reset signal to stop the ignition signal.

11. A system for detecting engine knocking as set forth in claim 10, wherein the second pulse signal is generated every 120 degrees of crankshaft revolution when said system is used in connection with a six-cylinder engine.

12. A system for detecting engine knocking as set forth in claim 10, wherein the second pulse signal is generated every 180 degrees of crankshaft revolution when said system is used in connection with a four-cylinder engine.

13. A system for detecting engine knocking as set forth in claim 10, wherein the second pulse signal is generated every 90 degrees of crankshaft revolution when said system is used in connection with an eight-cylinder engine.

14. A system for detecting engine knocking as set forth in claim 2, wherein the computing device is a microcomputer having memory means.

15. The system of claim 2 wherein said small angle comprises about 2° of crankshaft rotation.

16. The system of claim 2 wherein said small angle comprises about 1° of crankshaft rotation.

17. The method of claim 1 wherein said small angle comprises about 2° of crankshaft rotation.

18. The method of claim 1 wherein said small angle comprises about 1° of crankshaft rotation.

* * * * *